United States Patent
Leung

(10) Patent No.: US 7,325,282 B2
(45) Date of Patent: Feb. 5, 2008

(54) MULTIFUNCTIONAL ELECTRONIC CARABINER FOR CLIMBING

(75) Inventor: Sanio Leung, Hong Kong (HK)

(73) Assignee: Growtech Industrial Limited, Hong Kong (HK)

( * ) Notice: Subject to any disclaimer, the term of this patent is extended or adjusted under 35 U.S.C. 154(b) by 815 days.

(21) Appl. No.: 10/824,522

(22) Filed: Apr. 14, 2004

(65) Prior Publication Data
US 2005/0085210 A1 Apr. 21, 2005

(30) Foreign Application Priority Data
Oct. 18, 2003 (HK) .............................. 03107578.2
Jan. 9, 2004 (CN) ....................... 2004 2 0001533

(51) Int. Cl.
A44B 17/00 (2006.01)
(52) U.S. Cl. ............... 24/572.1; 455/66.1; 455/347; 455/575.6; 24/599.1; 24/599.9
(58) Field of Classification Search ............... 455/66.1, 455/575.6, 90.3, 344, 347–351; 24/582.1, 24/582.11, 592.1–600.2
See application file for complete search history.

(56) References Cited

U.S. PATENT DOCUMENTS 5,940,943 A * 8/1999 Kloster ..................... 24/588.1
6,336,260 B1 * 1/2002 Mauthner ..................... 24/376
6,625,469 B1 * 9/2003 Hwang et al. ........... 455/550.1
7,010,331 B2 * 3/2006 Johnson et al. .......... 455/575.1
2003/0167608 A1 * 9/2003 Petzl et al. ................ 24/600.2
2004/0205255 A1 * 10/2004 Joachim ........................ 710/1
2005/0239450 A1 * 10/2005 Wesby ......................... 455/418

* cited by examiner

Primary Examiner—Simon Nguyen
(74) Attorney, Agent, or Firm—Akerman Senterfitt

(57) ABSTRACT

The present invention discloses a carabiner for climbing, a body (1) thereof is connected with a left and a right arm parts (4) and (9) via hinges (5) and (10), the left and the right arm parts (4) and (9) respectively have concave-convex blocks engaging with blocks (3) and (8) of the body so as to perform the fastening function, a liquid crystal timing display (20) is installed on a front casing (1A) of the body (1), a button (13) for setting the modes of time and sound of the timer is mounted at a lower right side of the body (1), a transparent sight-glass shell (15) is disposed on the button (13), an electronic button (14) is arranged near the top of the right edge of the body for controlling the timing start and stop function of the timer, another group of key-press (12) is used for operating the sectional timing and the resetting mode of the timer, a compass is mounted at the lower part of the front casing (1A), a lighting bulb (16) is installed on the top of the body and a switch button (2) for the bulb is provided on the left side. The present invention integrates a plurality of functional objects, is very convenient for using and is attractive and practical.

10 Claims, 5 Drawing Sheets

MULTIFUNCTIONAL ELECTRONIC CARABINER FOR CLIMBING

TECHNICAL FIELD OF THE INVENTION

The present invention relates to a carabiner for climbing, more particularly, to a multifunctional electronic carabiner for climbing composed of a carabiner body, a timer, an electric torch, a compass, a radio and a thermometer etc.

BACKGROUND ART OF THE INVENTION

Carabiners for climbing available in the market are designed as unitary open-closed type single buckle, disadvantages thereof are that after fastening one object (such as a key) to the carabiner, a user is hard to fasten the carabiner and its attached objects to other objects (such as a knapsack), and is inconvenient to take them out. A double movable-buckle type carabiner of the present invention is designed in such way that hinge device respectively passes through the carabiner body so that the carabiner can be opened and closed from both sides and has an automatic rebound function by which the carabiner can be locked and released quickly for convenient use.

Compared with the prior art, the present invention can provide additionally one or more movable buckle(s), so that the user can use it more smartly and conveniently. After one object is fastened to the movable buckle on one side, other object(s) can also be fastened to it on another side, without impact on the former one object being taken out.

An object of the present invention is to provide a multifunctional electronic dual carabiner that is convenient for using and carrying, the dual carabiner incorporates the combination of the carabiner with a timer, an electric torch, a compass and a thermometer, and is more effective and convenient for use when compared with the prior art.

To achieve the above object, a multifunctional electronic carabiner of the present invention comprises a carabiner's front casing, a back casing, left and right movable arm buckles, hinges, a front photoscope, a liquid crystal timer, a compass, a lighting bulb, batteries, battery door, buttons, and other electronic switch key-press, etc.

The body of the carabiner is connected with the left and the right arm buckles respectively via movable hinges so that the carabiner can perform such functions as smart opening and closing and automatic rebounding and fastening. The left and the right arm buckles respectively have a concave-convex block so as to engage with a concave-convex block of the body to provide the fastening function. The front casing of the body is provided with a liquid crystal timer on which a transparent shell is mounted to protect the timer and improve its appearance, a button for setting the modes of time and sound of the timer is arranged at the lower right side of the timer.

The carabiner body is provided with two groups of electronic key-presses on the right side thereof which are used for controlling the timing function, i.e., the key press group at an upper right side thereof is used for controlling the timing start and stop of the timer, and another key-press group at a lower right side thereof is used for operating the sectional timing and resetting function mode of the timer. A compass is provided at a lower part of the front casing of the body to distinguish the direction, which is attractive and practical. A lighting bulb is installed on the top of the body and a button switch for the lighting bulb is provided on the left side, so that the carabiner also has function of a electric torch and is very convenient for using. The radio circuit located in the central cavity between the frontal cover and the back cover is connected with the functional keys, such as the switch key, the reset key and the channel search key etc.

For the battery and its circuit, an enclosed battery cover is additionally provided for fixing the battery.

BRIEF DESCRIPTION OF THE DRAWINGS OF THE INVENTION

The embodiments of the present invention is described in detail with reference to the accompanying drawings, in which.

DETAILED DESCRIPTIONS OF THE PREFERRED EMBODIMENTS OF THE INVENTION

Figure 1:
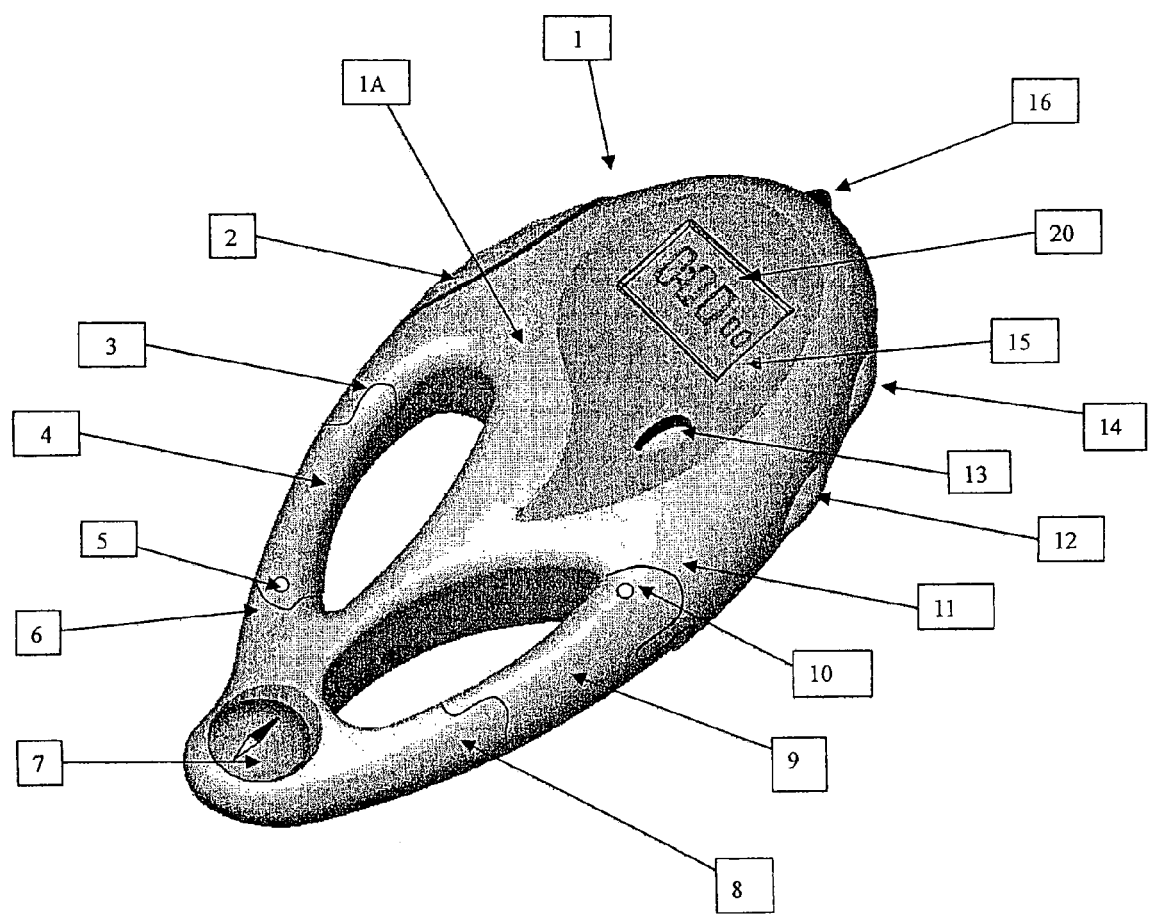
FIG. 1 is a front perspective view of the multifunctional electronic carabiner according to an embodiment of the present invention.

Concave-convex blocks 3 and 6 on the left side of a body 1 of the multifunctional electronic carabiner shown in the FIG. 1 correspond to a movable arm part 4, in which the concave-convex block 6 is connected with the movable arm part 4 via a hinge 5 passing through them.

The concave-convex blocks 11 and 8 are provided on the right side of the body 1 and correspond to the movable arm part 8, in which the concave-convex block 11 is connected with the movable arm part 9 via a hinge 10 passing through them.

The bulb 16 is installed on the top of the body 1 and is switched on or off by a key-press 2 on the left side; a liquid crystal timing display 20 and its circuit are installed at the front of the body 1, a button 13 for controlling the functional mode of the liquid crystal timing display 20 is also arranged at the front of the body 1, and buttons 12 and 14 are provided respectively on the left and the right edges of the body 1, in which the button 12 is disposed at the center of the edge of the body 1, and the button 14 is arranged at a position on the edge near to the top of the body 1.

A transparent sight-glass shell 15 is provided on the front end cover of the front liquid crystal timing display 20 of the body 1, and a compass 7 is installed at the lower part of the front casing 1A of the body.

Figure 2:
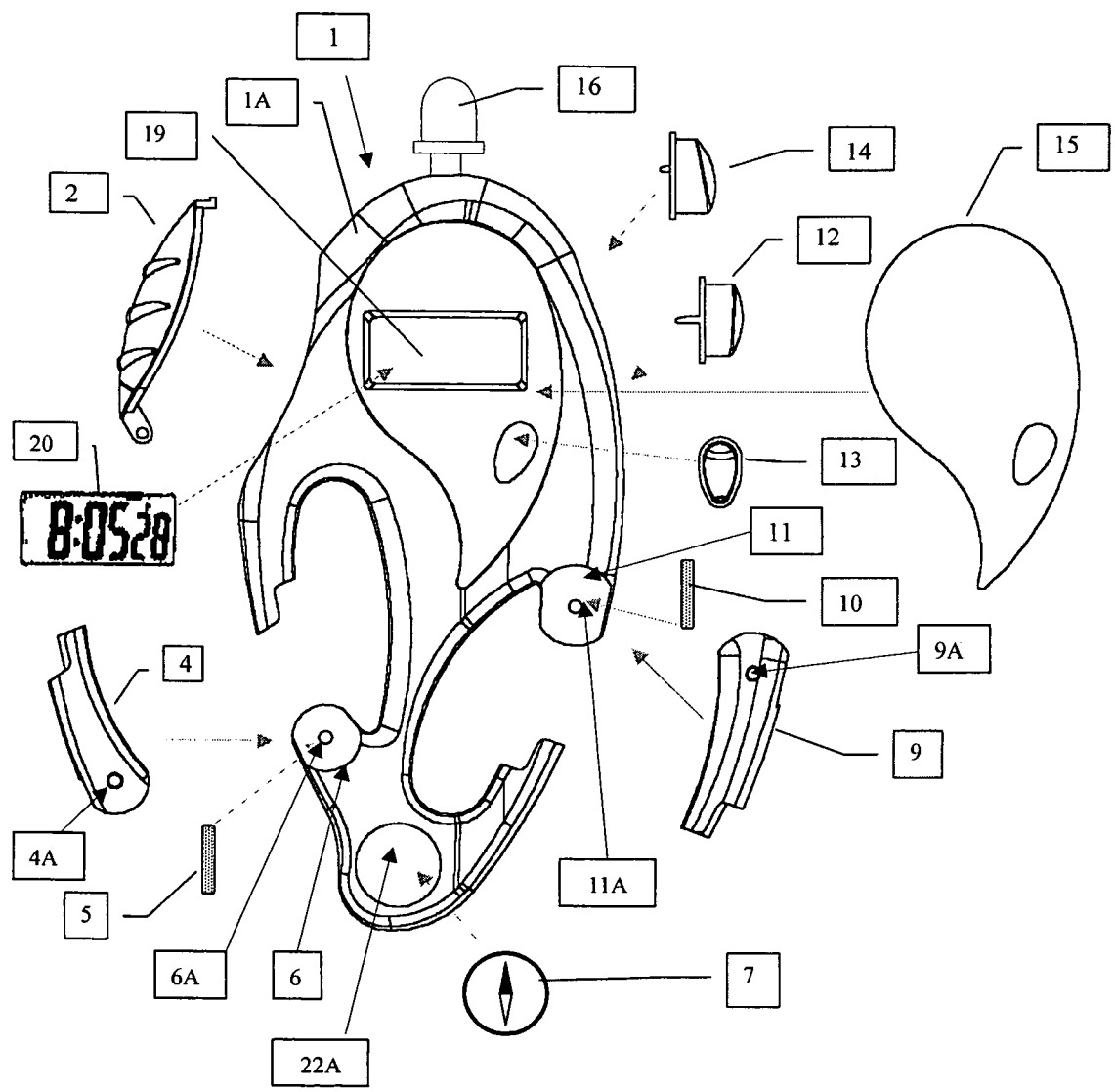
FIG. 2 is a front sectional view of the multifunctional electronic carabiner shown in FIG. 1.

The concave-convex block 6 on the left side of the body 1 of the multifunctional electronic carabiner shown in the FIG. 2, which corresponds to the movable arm part 4, has a hole 6A, the hole 6A and a arm hole 4A of the movable arm part 4 are passed through by a hinge 5. A hole 11A of the concave-convex block 11 corresponding to the movable arm part 9 on the right side of the body 1 is provided, the hole 11A and the arm hole 9A of the movable arm part 9 are passed through by a hinge 10.

A bulb 16 is installed in a top hollow cavity of the body 1 and is switched on or off by the key-press 2 on the left side, the liquid crystal timing display 20 and its circuit are installed in the hollow cavity 19 of the front casing 1A of the body 1, a button 13 for controlling the functional mode of the liquid crystal timing display 20 is arranged at the front of the body 1, buttons 12 and 14 are provided respectively on the left and the right edges of the body 1, the button 12 is disposed at the center of the edge of the body 1, and the button 14 is arranged at a position on the edge which is near to the top of the body 1; a groove block 17 is provided on the left side of the body 1 so as to be engaged with the key-press 2; a transparent sight-glass shell 15 is provided on the front end cover of the front liquid crystal timing display 20 of the front casing 1A of the body 1, and the compass 7 is installed in a groove 22A at the lower part of the front casing 1A of the body 1.

Figure 3:
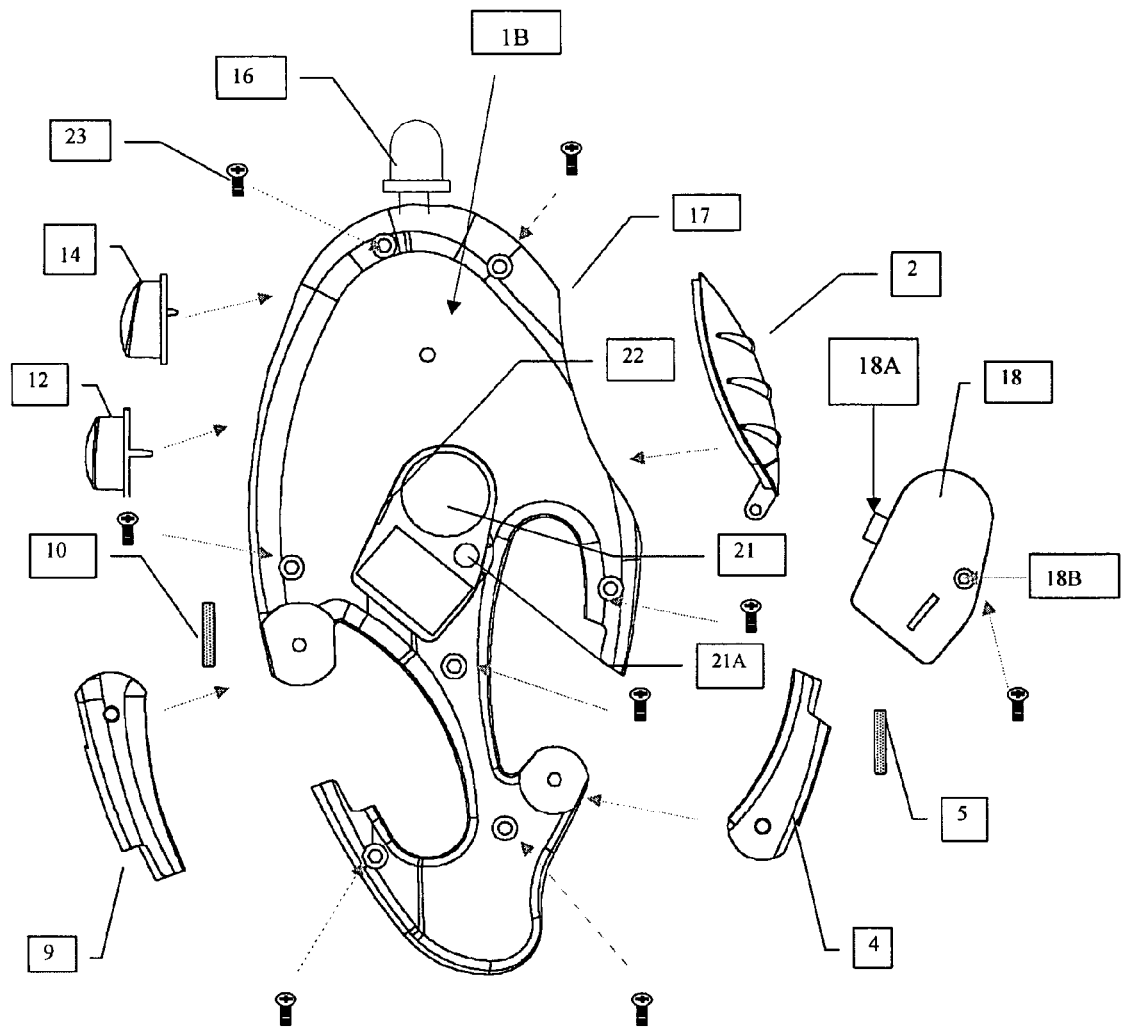
FIG. 3 is a back sectional view of the multifunctional electronic carabiner shown in FIG. 1.

A battery 21 and its circuit are installed in a hollow cavity of the back casing 1B of the body of the multifunctional electronic carabiner shown in the FIG. 3, and an enclosed battery cover 18 is additionally provided for covering the battery, and is provided with an embedded-type post matching with a embedded jack 22 to fix the battery. A threaded hole 18B is formed on the enclosed battery cover and is connected with the device hole 21A of the battery 21 by screws 23; the back casing 1B of the body has a plurality of threaded holes and is combined with the front casing 1A of the body 1 by screws 23.

The Second Embodiment

Figure 4:
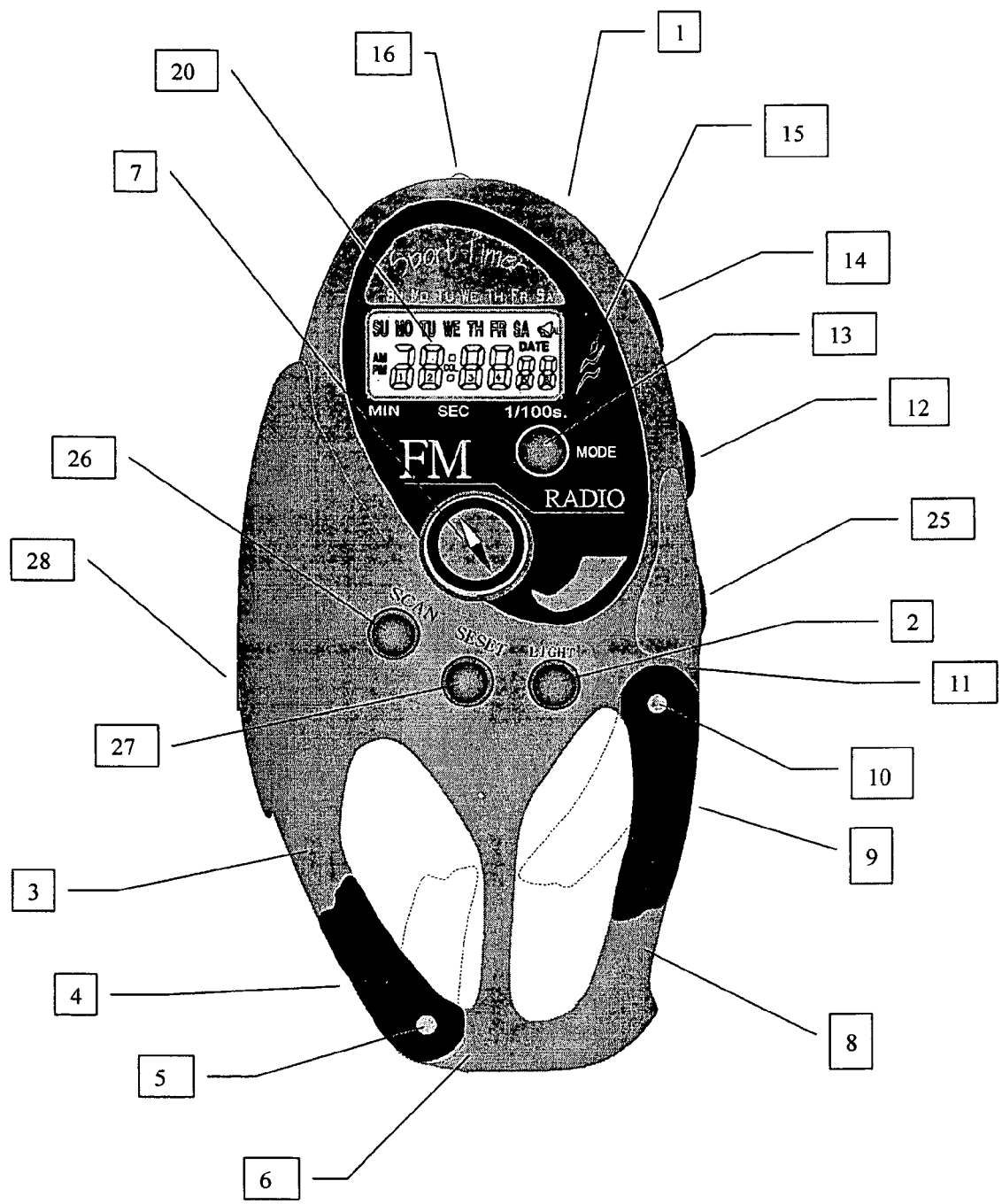
FIG. 4 is the front view of the second embodiment according to the present utility model.

The main body 1 of the multifunctional electronic carabiner for climbing shown in FIG. 4 is in through connection with the concave-protruding notch 6 of the movable arm member 4 by a hinge 5 at the left side thereof, and a movable arm member 9 is also in through connection with its corresponding concave-protruding notch 11 by a hinge 10. A bulb 16 disposed at the top of the main body 1 is switched on/off by the key 2, the liquid crystal timing display 20 and its circuits are disposed at the frontal cover 1A of the maim body, and a key 13 is disposed at the frontal face of the main body for operating the function modes of the liquid crystal timing display 20, the keys 12 and 14 are disposed at the right side of the main body respectively; the radio circuit 19 is disposed in the central cavity of the main body 1, which is connected with the functional key 25, keys 26 and 27, the key 25 is for adjusting volume and controlling on/off, and the keys 26 and 27 are for controlling the channel search and the resetting function of the radio, a earphone hole 28 is disposed at one end of the radio circuit board 19; a transparent video mirror cover 15 is disposed at the frontal cover of the liquid crystal timing display 20 on the frontal cover 1A of the main body, and a compass 7 is disposed within the frontal groove 22A of the frontal cover 1A of the main body 1.

Figure 5:
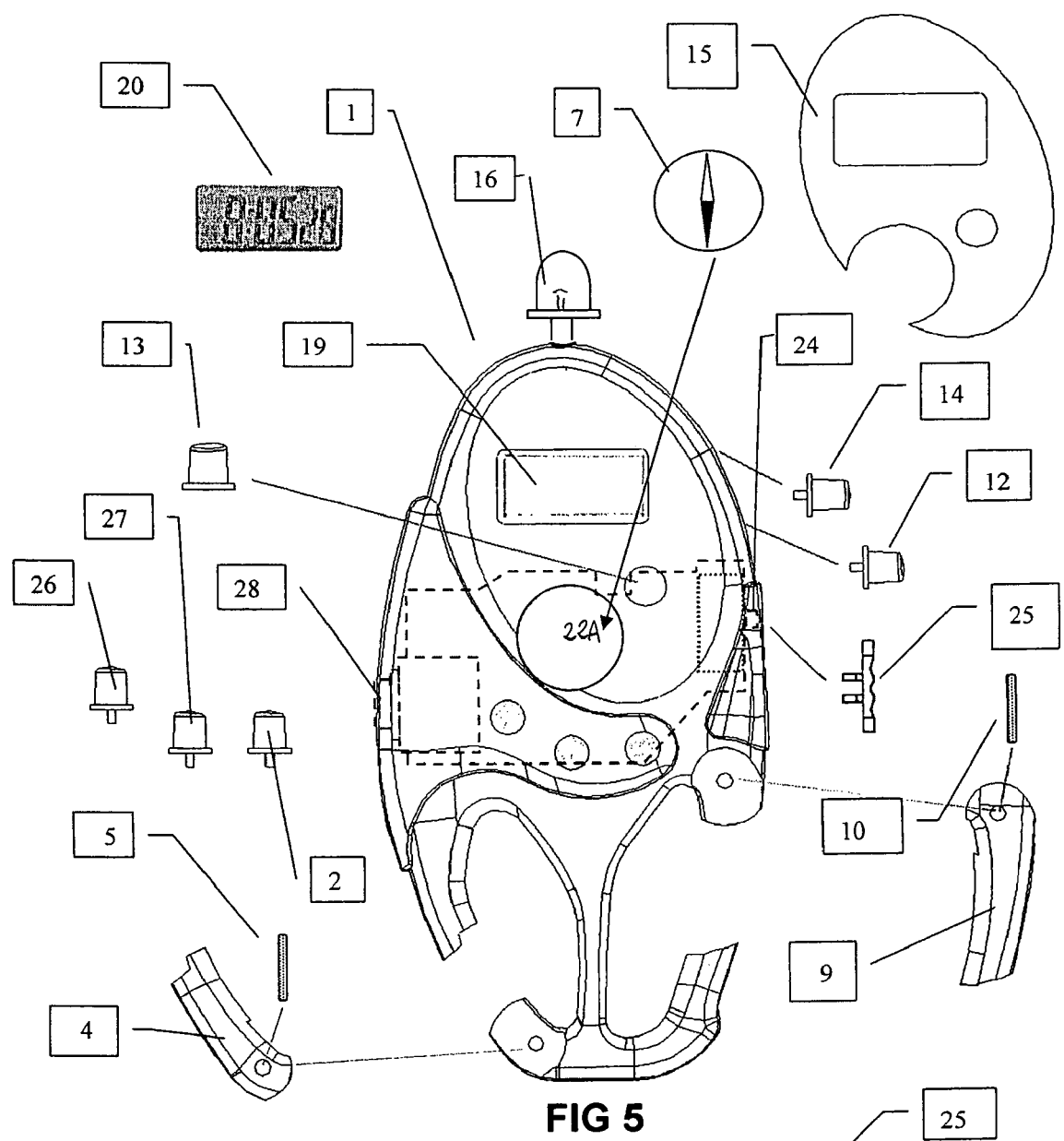
FIG. 5 is the front sectional view of the second embodiment according to the present utility model.

The main body 1 of the multifunctional electronic carabiner for climbing shown in FIG. 5 is in through connection with the concave-protruding notch 6 of the movable arm member 4 by a hinge 5 at the left side thereof, and a movable arm member 9 is also in through connection with its corresponding concave-protruding notch 11 by a hinge 10. A bulb 16 disposed at the top of the main body 1 is switched on/off by the key 2, the liquid crystal timing display 20 and its circuits are disposed at the frontal cover 1A of the maim body, and a key 13 is disposed at the frontal face of the main body for operating the function modes of the liquid crystal timing display 20, the keys 12 and 14 are disposed at the right side of the main body respectively; the radio circuit 19 is disposed at the position shown by broken line in the central cavity of the maim body 1, a concave part 17 located at the central position of the frontal cover can be combined with the key 2, in addition, the concave part 26A could be combined with the key 26, the concave part 27A could be combined with the key 27, and the keys 26 and 27 are for controlling the channel search and the resetting function of the radio, and a protruding groove 24 positioned at one end of the radio circuit board 19 is combined with the functional key 25 for adjusting volume and controlling on/off, a earphone hole 28 is disposed at one end of the radio circuit board 19; a transparent video mirror cover 15 is disposed at the frontal cover of the liquid crystal timing display 20 on the frontal cover 1A of the main body, and a compass 7 is disposed within the frontal groove 22A of the frontal cover 1A of the main body 1.

Figure 6:
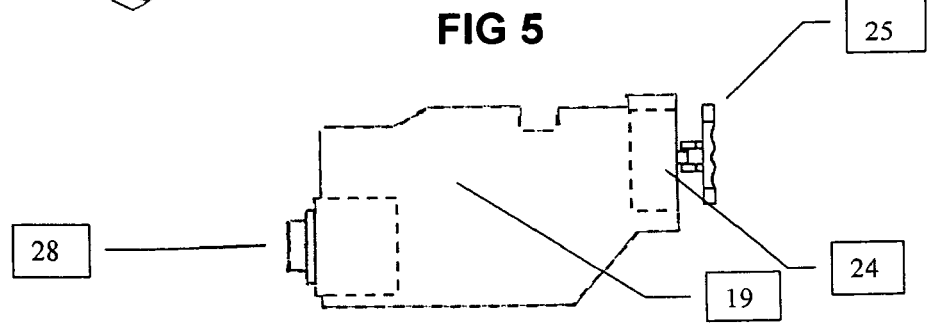
FIG. 6 is the explanatory scheme of the radio circuit board in the FIG. 4.

As shown in FIG. 6, which shows that the radio circuit board 19 and its switching protruding groove 24 are combined with the functional key 25, the functional key 25 is for adjusting the volume and turning on/off, and a hole 28 on the radio circuit board 19 could be combined with the earphone.

The connection between the body and the arm parts of the carabiner of the present invention is not limited to the hinged connection, and other movable connections can be used; the profile of the body can also formed in a shape of circular, semicircular, elliptic, semi-elliptic shape or other appropriate shapes. Such changes all fall into scope of the present invention which is defined by the appended claims and the equivalents thereof.

What is claimed is:

1. A multifunctional electronic carabiner for climbing, comprising; a carabiner's front casing, a back casing, a left arm part and a right arm part, a left hinge and a right hinge, a front photoscope, a liquid crystal timer, a compass, a bulb, batteries, a battery door, and functional buttons thereof,
wherein the body of the carabiner and the left and the right arm parts are respectively passed through by the movable hinges, and each of the left and the right arm parts has a concave-convex block which can be engaged with blocks of the body respectively.

2. The multifunctional electronic carabiner for climbing according to claim 1,
wherein a liquid crystal display is provided on the front casing of the body, a button is provided for controlling the functional mode of the liquid crystal timing display, buttons are provided respectively on the left and the right edges of the body, one of said buttons is disposed at the center of the edge of the body, and one of said buttons is arranged at a position on the edge which is near to the top of the body, and all the above are sandwiched tightly in place by the front casing and the back casing.

3. The multifunctional electronic carabiner for climbing according to claim 2,
wherein the liquid crystal timing display of the front casing of the body is provided with a transparent sight-glass shell on the front end thereof.

4. The multifunctional electronic carabiner for climbing according to claim 3, wherein connection between the body and the arm parts of the carabiner is not limited to the connection formed by the hinges, and other movable connections can be used;
the profile of the body can also be formed in a shape of circular, semicircular, elliptic, semi-elliptic shape, or other appropriate shapes.

5. The multifunctional electronic carabiner for climbing according to claim 2, wherein connection between the body and the arm parts of the carabiner is not limited to the connection formed by the hinges, and other movable connections can be used;

the profile of the body can also be formed in a shape of circular, semicircular, elliptic, semi-elliptic shape, or other appropriate shapes.

6. The said multifunctional electronic carabiner for climbing according to claim 1, wherein a radio circuit board is housed in the cavity between the frontal cover and the back cover, a functional key for turning on/off the radio and volume adjustment is disposed at the right side of the main body, and keys are disposed separately at the frontal surface of the frontal cover for operating the channel search and resetting function, and the circuit board of the radio is sandwiched between the frontal cover and the back cover for location.

7. The multifunctional electronic carabiner for climbing according to claim 6, wherein connection between the body and the arm parts of the carabiner is not limited to the connection formed by the hinges, and other movable connections can be used;

the profile of the body can also be formed in a shape of circular, semicircular, elliptic, semi-elliptic shape, or other appropriate shapes.

8. The multifunctional electronic carabiner for climbing according to claim 1, wherein a bulb is installed on the top of the body and is switched on or off by the key-press on the left side, and a compass is provided on the front casing of the body.

9. The multifunctional electronic carabiner for climbing according to claim 8, wherein connection between the body and the arm parts of the carabiner is not limited to the connection formed by the hinges, and other movable connections can be used;

the profile of the body can also be formed in a shape of circular, semicircular, elliptic, semi-elliptic shape, or other appropriate shapes.

10. The multifunctional electronic carabiner for climbing according to claim 1, wherein connection between the body and the arm parts of the carabiner is not limited to the connection formed by the hinges, and other movable connections can be used;

the profile of the body can also be formed in a shape of circular, semicircular, elliptic, semi-elliptic shape, or other appropriate shapes.

* * * * *